(12) United States Patent
Jamieson

(10) Patent No.: US 12,188,568 B2
(45) Date of Patent: Jan. 7, 2025

(54) VALVE APPARATUS

(71) Applicant: JB VALVES LIMITED, Huddersfield (GB)

(72) Inventor: Alexander Stuart Jamieson, Huddersfield (GB)

(73) Assignee: JB VALVES LIMITED, Huddersfield (GB)

( * ) Notice: Subject to any disclaimer, the term of this patent is extended or adjusted under 35 U.S.C. 154(b) by 0 days.

(21) Appl. No.: 18/278,943

(22) PCT Filed: Feb. 25, 2022

(86) PCT No.: PCT/GB2022/050514
§ 371 (c)(1),
(2) Date: Aug. 25, 2023

(87) PCT Pub. No.: WO2022/180404
PCT Pub. Date: Sep. 1, 2022

(65) Prior Publication Data
US 2024/0142011 A1    May 2, 2024

(30) Foreign Application Priority Data
Feb. 25, 2021 (GB) ..................... 2102710

(51) Int. Cl.
*F16K 17/04* (2006.01)
*F16K 47/00* (2006.01)

(52) U.S. Cl.
CPC ........ *F16K 17/044* (2013.01); *F16K 47/0111* (2021.08); *Y10T 137/7929* (2015.04)

(58) Field of Classification Search
CPC ............. Y10T 137/7929; F16K 17/044; F16K 47/0111
See application file for complete search history.

(56) References Cited

U.S. PATENT DOCUMENTS

| | | | |
|---|---|---|---|
| 2,686,534 A | 8/1954 | Oscar | |
| 5,378,118 A * | 1/1995 | Phillips | F04C 14/26 137/493.4 |

(Continued)

FOREIGN PATENT DOCUMENTS

| | | |
|---|---|---|
| CN | 103216213 A | 7/2013 |
| GB | 0 672 340 A | 5/1952 |
| GB | 2 537 561 A | 10/2016 |

OTHER PUBLICATIONS

International Search Report and Written Opinion on PCT App. PCT/GB2022/050514 dated Jun. 13, 2022 (11 pages).

(Continued)

*Primary Examiner* — Daphne M Barry
*Assistant Examiner* — Frederick D Soski
(74) *Attorney, Agent, or Firm* — Foley & Lardner LLP

(57) ABSTRACT

The present invention relates to valve apparatus for regulating flow. The apparatus comprises a valve housing having a bore. A piston member (7) is movable within the bore, a first spring member biasing the piston member in a first direction within the bore. A first rod (12) extends through the piston member, the first rod having an end (13) for engaging a second spring member (14) provided between the end (13) and a spring seat (8). The piston member (7) and spring seat define a chamber (9) which houses the second spring member (14) and into which the first rod is slidably received. Further, a second rod extends from the spring seat and is coupled to valve member seat. A damping means is provided to damp the movement of the chamber (9) within the bore.

10 Claims, 7 Drawing Sheets

(56) References Cited

U.S. PATENT DOCUMENTS

| | | | | |
|---|---|---|---|---|
| 5,412,948 A * | 5/1995 | Komura | ................. | F16H 61/40 |
| | | | | 137/539.5 |
| 6,691,512 B1 * | 2/2004 | Kopel | .................. | F16K 17/196 |
| | | | | 60/489 |
| 6,719,005 B1 * | 4/2004 | Trimble | ................. | F16K 17/18 |
| | | | | 137/513.3 |
| 6,964,280 B1 * | 11/2005 | Trimble | ............... | F16K 17/044 |
| | | | | 137/493.9 |
| 7,028,708 B1 * | 4/2006 | Langenfeld | ............ | F16K 17/18 |
| | | | | 137/513.5 |
| 7,066,199 B1 * | 6/2006 | Trimble | ............... | F16K 17/196 |
| | | | | 137/493.5 |
| 7,320,334 B1 * | 1/2008 | Trimble | ............. | F15B 11/0445 |
| | | | | 137/493.1 |
| 7,467,642 B2 | 12/2008 | Prinsen et al. | | |
| 8,205,641 B2 * | 6/2012 | Richardson | ........ | F16K 31/5245 |
| | | | | 137/881 |
| 9,770,726 B2 * | 9/2017 | Zhou | ...................... | B05B 12/10 |
| 10,337,630 B2 * | 7/2019 | Apadula | ............. | F16K 17/044 |
| 10,437,269 B1 * | 10/2019 | Zähe | ..................... | F15B 13/029 |
| 10,753,493 B2 * | 8/2020 | DeFelice | ................... | F02C 9/18 |
| 2011/0180164 A1 * | 7/2011 | Voss | ..................... | F16K 17/046 |
| | | | | 137/535 |
| 2015/0375722 A1 * | 12/2015 | Hennig | ................ | F04B 53/125 |
| | | | | 251/62 |
| 2024/0142011 A1 * | 5/2024 | Jamieson | ........... | F16K 17/0433 |

OTHER PUBLICATIONS

Examiner's Report dated Jul. 20, 2022 on App. GB2102710.0 (2 pages).

\* cited by examiner

VALVE APPARATUS

CROSS-REFERENCE TO RELATED APPLICATIONS

This application is a 371 US national application of International Application No. PCT/GB2022/050514, filed Feb. 25, 2022, which claims the benefit of and priority to United Kingdom Application No. 2102710.7, filed Feb. 25, 2021, each of which are hereby incorporated by reference herein in their entirety.

The present invention relates to valve apparatus, and particularly though not exclusively, to valve apparatus for use in oil and gas flaring operations.

In this respect, flaring is the controlled burning of natural gas and is a common practice in oil and gas exploration, production and processing operations. A flare system consists of a flare stack and pipes that feed gas to the stack.

During oil production, natural gas is produced from a reservoir together with the oil. Some of this gas is often flared i.e. burned, rather than conserved or used for productive purposes. In this connection, gas flaring is carried out, either as a means of disposal or as a safety measure to relieve pressure.

Flaring processes can be classified into three groups: emergency flaring, process flaring and production flaring.

Emergency flaring can occur during the case of a fire, a breakage of one or more valves, or perhaps compressor failures. In a short duration of time, a very large volume of gas with high velocity is burned.

Process flaring usually comes with a lower rate, such as during petro-chemical processing, where some waste gases are removed from the production stream and then flared.

Production flaring occurs in the exploration and production sector of oil-gas industry. In this regard, large volumes of gas will be combusted during the evaluation of a gas-oil potential test as an indication of the capacity of the well for production.

In this regard, a situation that causes major problems for any gas or/and oil well globally, is that the extremely harsh conditions that the Down Hole Safety Valve (DHSV) or Surface Controlled Subsurface Safety Valve (SCSSV) are exposed to, regularly cause the these valves to fail prematurely in such a way that they leak product gases (sometimes the lethal H2S) and production crude into the DHSV/SCSSV control tubework, hoses and then the Hydraulic Power Unit (HPU) reservoir.

Moreover, as there is commonly solid material like sand and gravel in the product crude, if it contaminates the hydraulic fluid reservoir, it must be cleaned and flushed before any further use, dirty fluid will cause premature failure in other control valves and xmas tree actuators/valves.

Consequently, one method presently still used has been to divert the leaking fluids and gases to a flare to burn them off. The DHSV/SCSSV is not easily serviceable due to its position (inside the well) and the fact that in the closed state it retains product gases and fluids within the well.

Clearly, the risk of leaking fluids/gases damaging equipment, causing costly downtime and moreover meaning that the associated contaminants are introduced into the environment are to be avoided.

According to the present invention there is provided valve apparatus for regulating flow comprising: a valve housing having a bore; a piston member movable within the bore, a first spring member biasing the piston member in a first direction within the bore; a first rod extending through the piston member, the first rod having an end for engaging a second spring member provided between the end and a spring seat; wherein the piston member and spring seat define a chamber which houses the second spring member and into which the first rod is slidably received; a second rod extending from the spring seat and being coupled to valve member seat; wherein damping means is provided to damp the movement of the chamber within the bore. In this connection, the valve apparatus of the present invention affords a self-contained, automatic and adjustable arrangement for allowing different opening and closing characteristics of a valve member seat, which operates solely on the in-line pressure provided to the valve apparatus.

Preferably, the damping means comprises a fluid provided in the bore in the region of the first spring member. Alternative or additional suitable damping arrangements, such as friction plates, may be provided.

Preferably, the damping means is tunable to different degrees of damping. In this regard, depending upon local requirements, the damping characteristics can be altered to suit needs.

Preferably, the piston member and spring seat are coupled together to form a piston that is movable as a unitary member within the bore.

Preferably, the spring constant of the first and second springs is different.

Preferably, the spring constant of the second spring is such that it is easier to compress compared with the first spring.

Preferably, the first spring member extends around the first rod.

Preferably, the first rod comprises an adjustment element that at one end extends within an outer rod sleeve, the other end of the adjustment element projecting out from the housing for depth adjustment of the within the housing.

Certain preferred embodiments of the present invention will now be described with reference to the accompanying drawings, of which:

Figure 1:
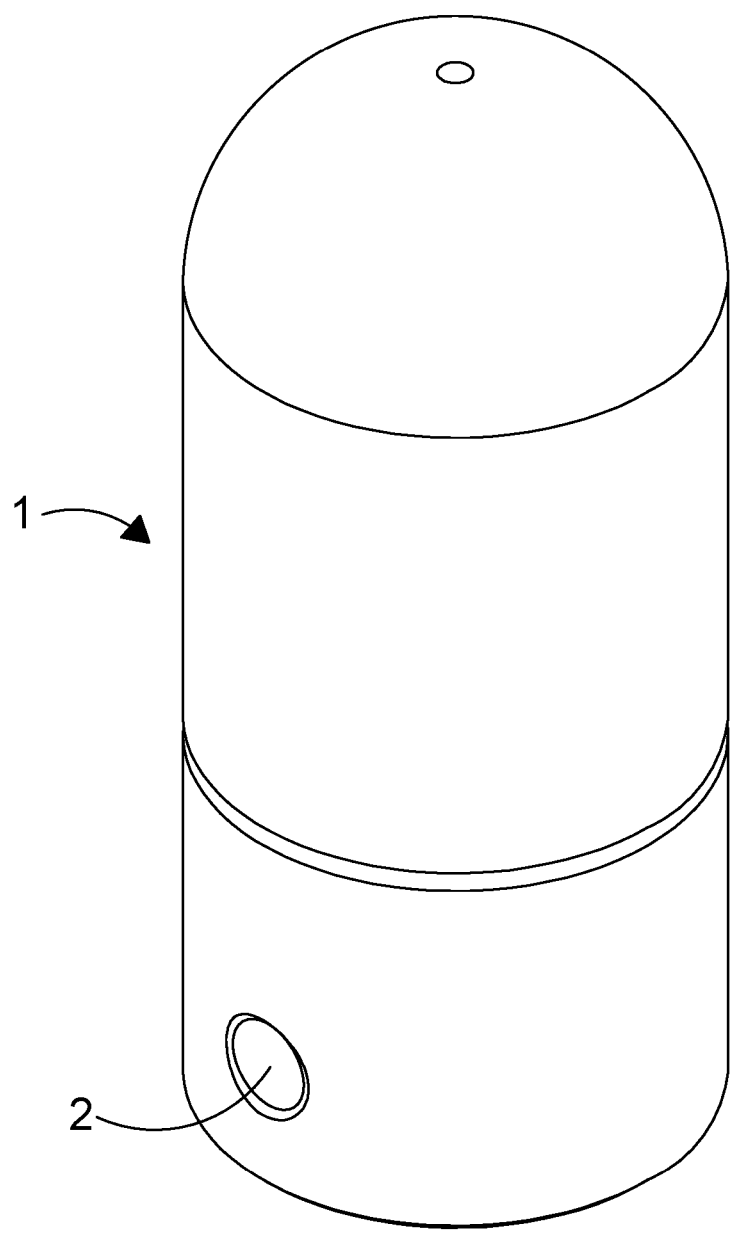
FIG. 1 shows the external casing of valve apparatus of the present invention.
Figure 6:
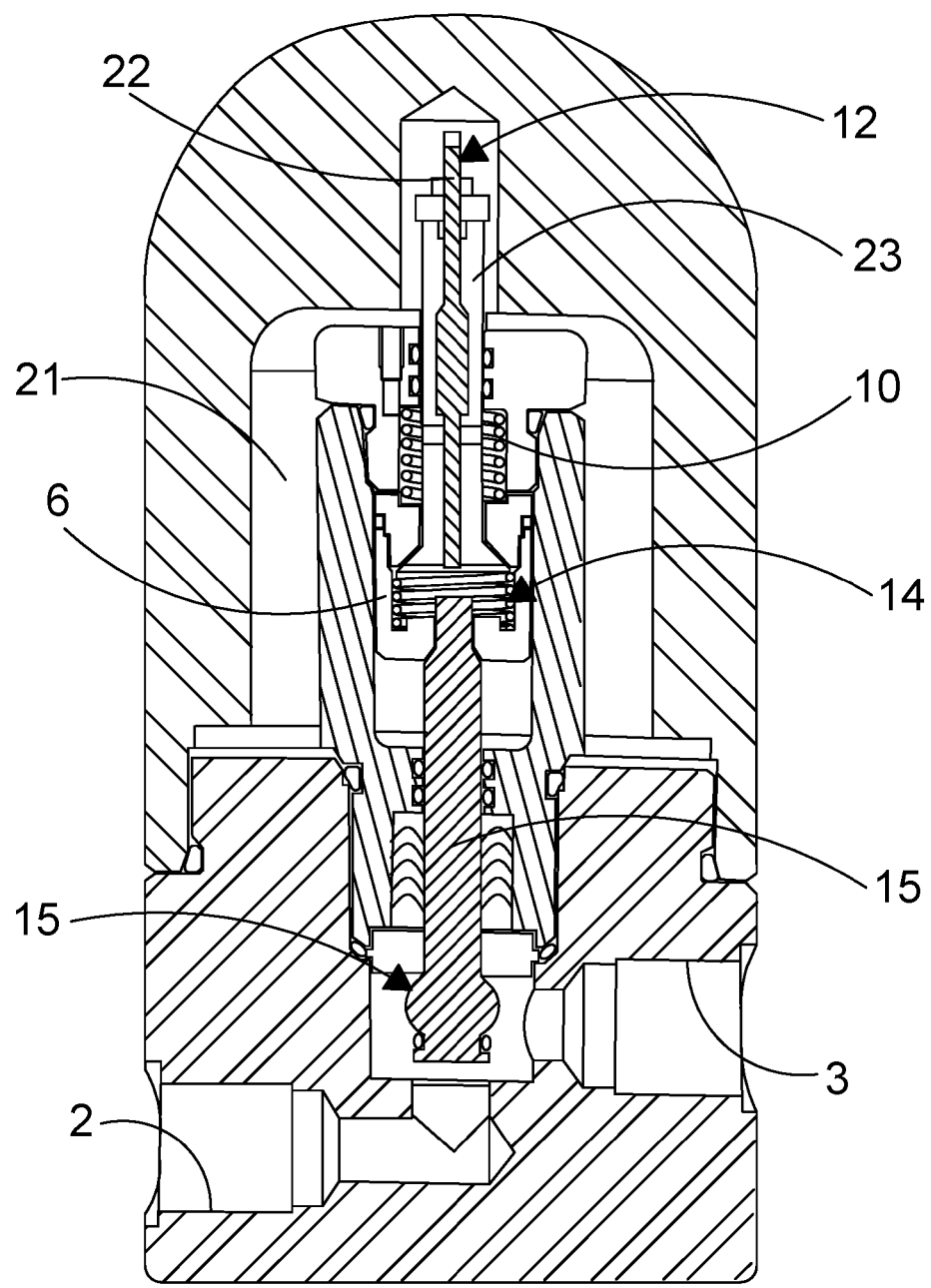
FIG. 6 shows a cross-sectional view of the apparatus of the present invention in a closed position.

FIG. 1 shows a perspective view of the outer casing of a valve apparatus 1 of the present invention. The casing has inlet/outlet ports 2, 3 for coupling into a relevant gas line. As shown in FIG. 6, the valve apparatus is provided in a viscous fluid cavity 21.

FIGS. 2 to 5 show the internal components of the valve apparatus. In this regard, the purpose of the valve is to open quickly when sufficient pressure is provided in line, but to close relatively slowly once the pressure has dropped.

Figure 2:
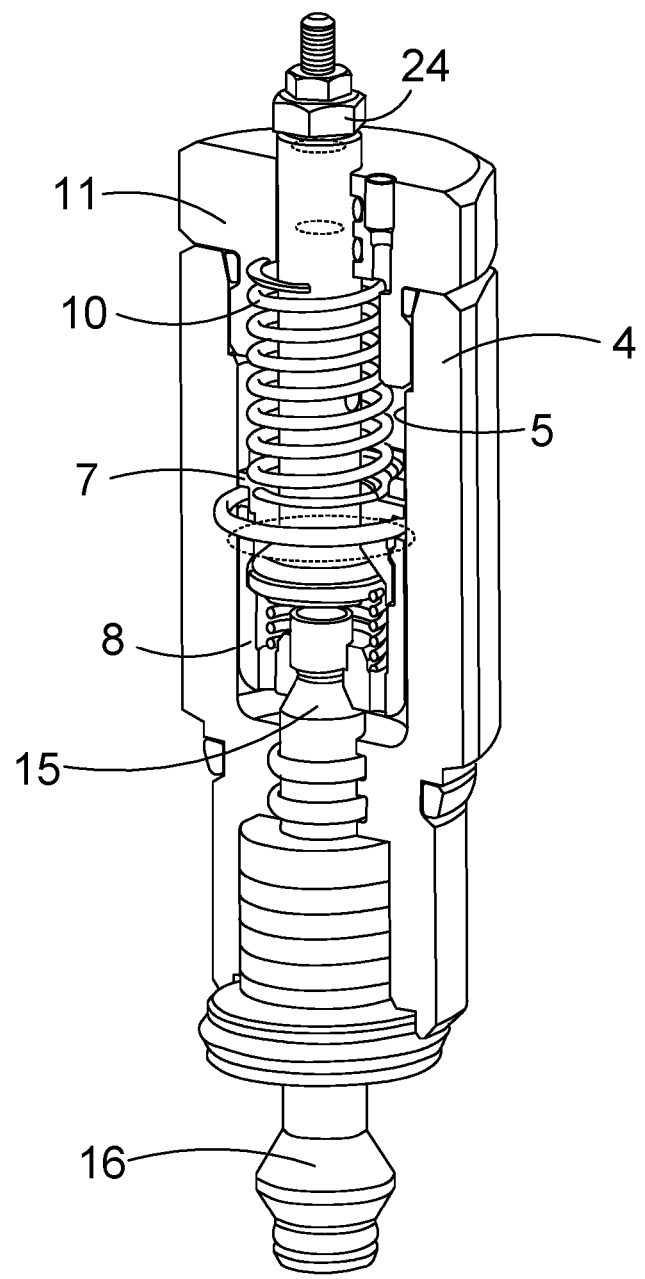
FIG. 2 shows a cross-section through the internal components of valve apparatus according to the present invention.
Figure 3:
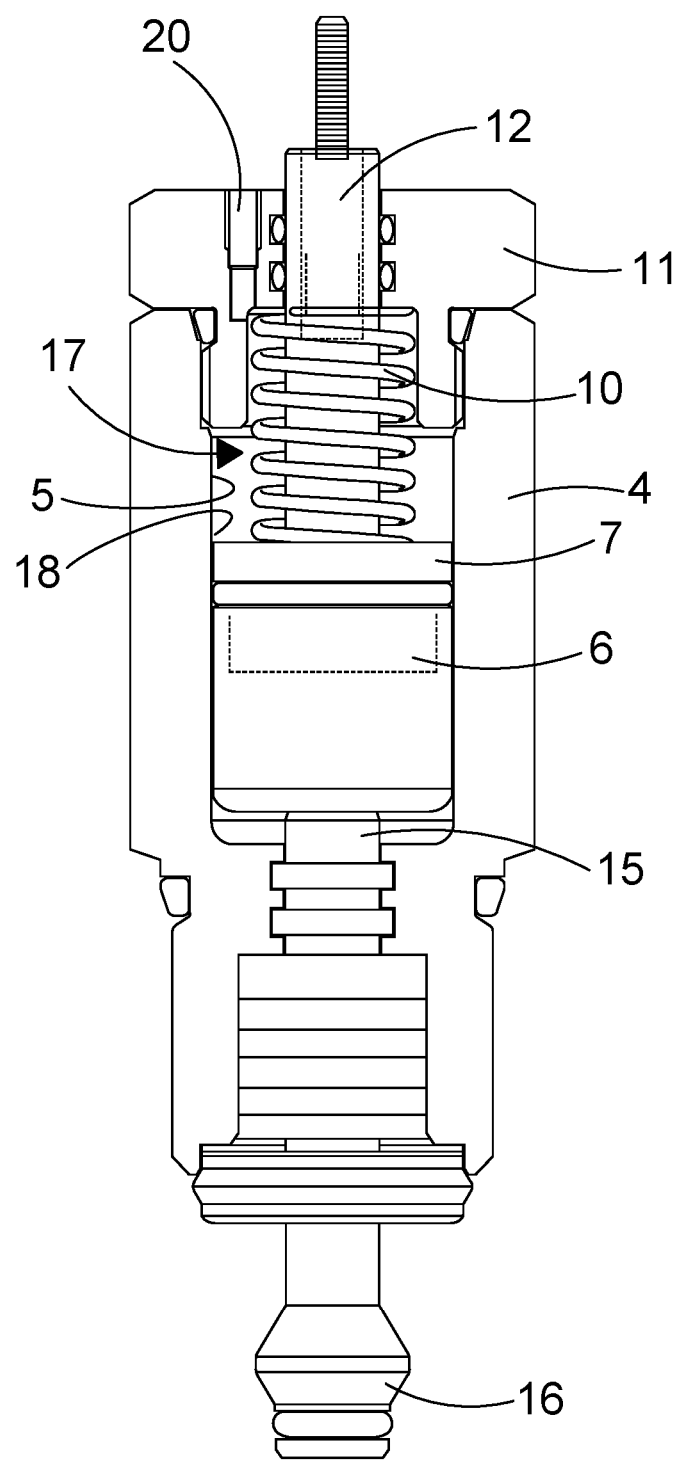
FIG. 3 shows a detailed view of a valve assembly component of the present invention in cross-section.
Figure 4:
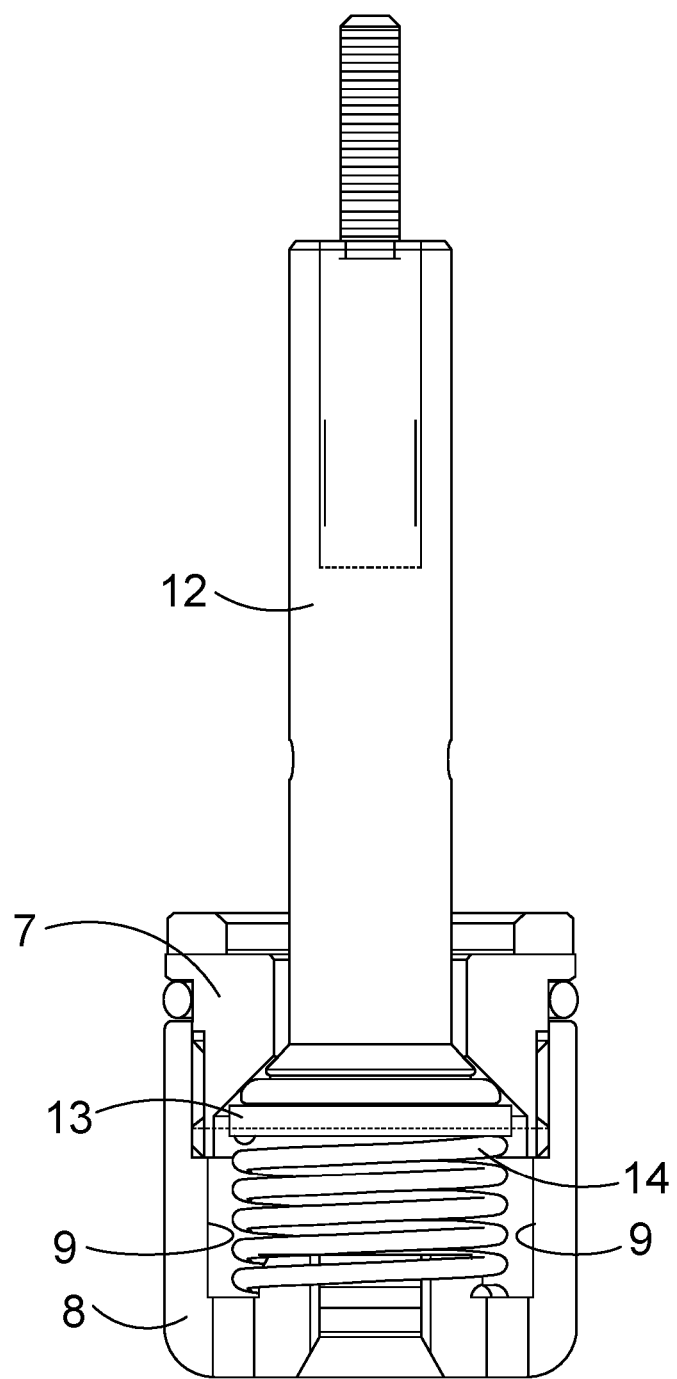
FIG. 4 shows a detailed view of a piston chamber component of the present invention in cross-section.

In this connection, as shown in FIGS. 2 and 3, the valve apparatus has a valve housing 4 having a bore 5. The bore extends through the housing, its diameter changing along its axial extent to accommodate the different components housed therein.

A piston component 6 is axially movable within a main bore section 18 of the bore, the piston component having a piston head 7 and a spring seat 8 that together form a cavity 9. A first spring member 10 biases the piston component in a first axial direction within the bore, namely away from the cap 11.

A first rod 12 extends through the cap 11 and through the piston head 7, the first rod having an end 13 for engaging a second spring member 14 provided within the piston cavity between the end 13 and a spring seat 8.

The first rod 12 is slidably received through the piston head 7 and cap 11.

A second rod 15, i.e. the valve stem, extends from the spring seat and is coupled to valve seat member 16.

As shown in the detail of FIG. 3, damping means 17 is provided to damp the movement of the piston component 6 within the bore. The damping means takes the form of fluid introduced into the main bore section 18. The damping effect of the fluid can be varied by compressing the fluid within the main bore section. Damping fluid can be introduced and topped up as required via port 20.

Figure 5:
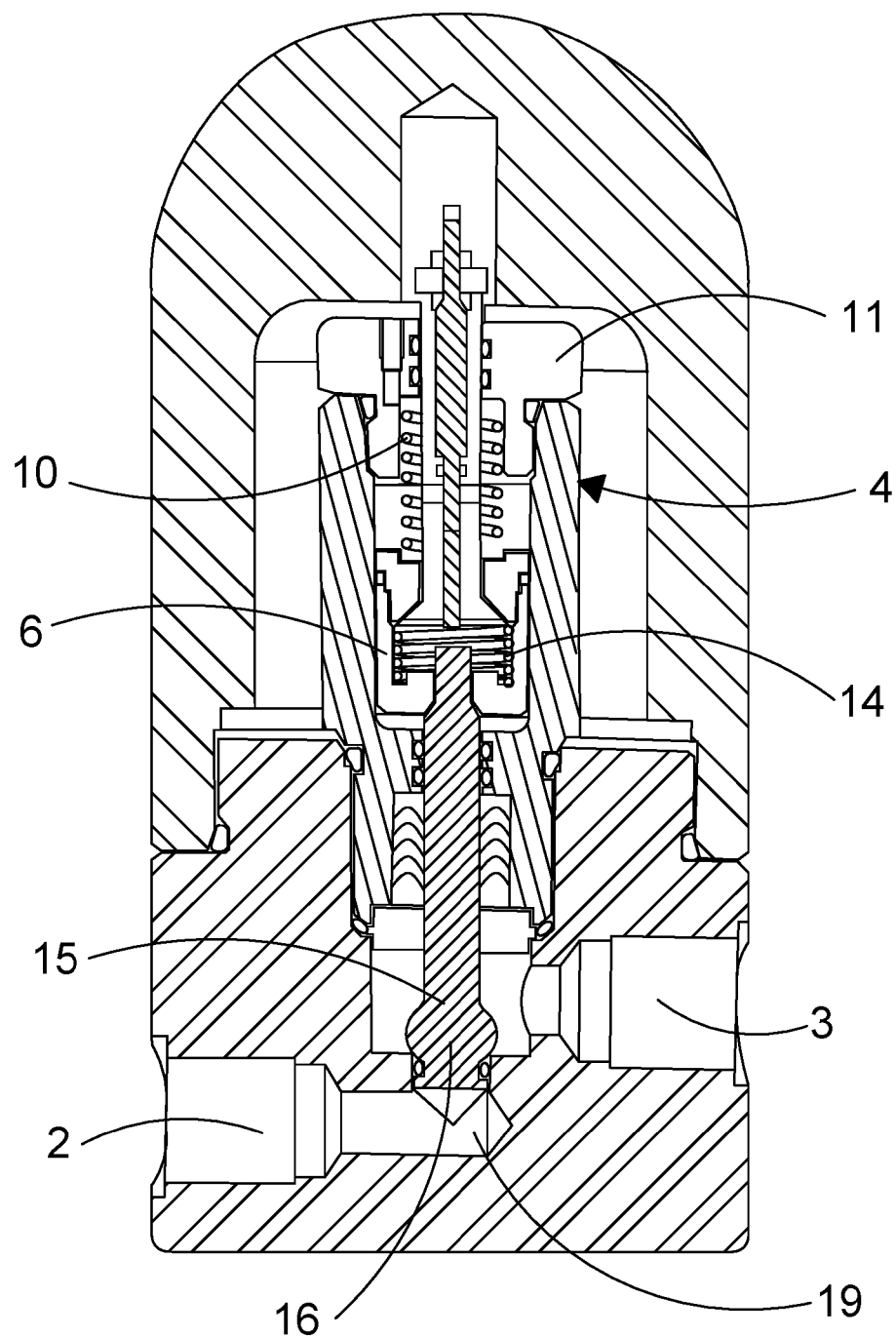
FIG. 5 shows a cross-sectional view of the apparatus of the present invention in an open position.

Operation of the valve apparatus will be described, particularly in relation to FIGS. 5 and 6.

In this connection, when in a closed state the valve seat member 16 is seated in port 19 so that there is no flow through the valve apparatus.

On application of fluid, such as gas, under a threshold pressure the valve stem 15 lifts as the compression from the second spring member 14 urging the stem and valve seat member 16 into the port is overcome. As the valve stem lifts, the valve seat member moves way from the port, opening the same to the flow of fluid. The relative ease of overcoming the bias of spring 14 allows for a rapid opening of the valve apparatus.

Once lifted from the port 19, the line pressure will continue to lift the valve stem 15, which as the second spring becomes compressed in turn acts to lift the whole piston component 6 into a delay position as shown in FIG. 6.

If the line pressure drops then the piston component 6 will begin to move, in this case downwardly, under the action of the first main spring member 10, but relatively slowing due to the damping effect of the fluid in the main bore section 18. As a result the valve stem will move relatively slowly so that the valve seat member will be delayed in closing port 19.

In this way, the valve apparatus allows for rapid opening and delayed closing.

Figure 7:
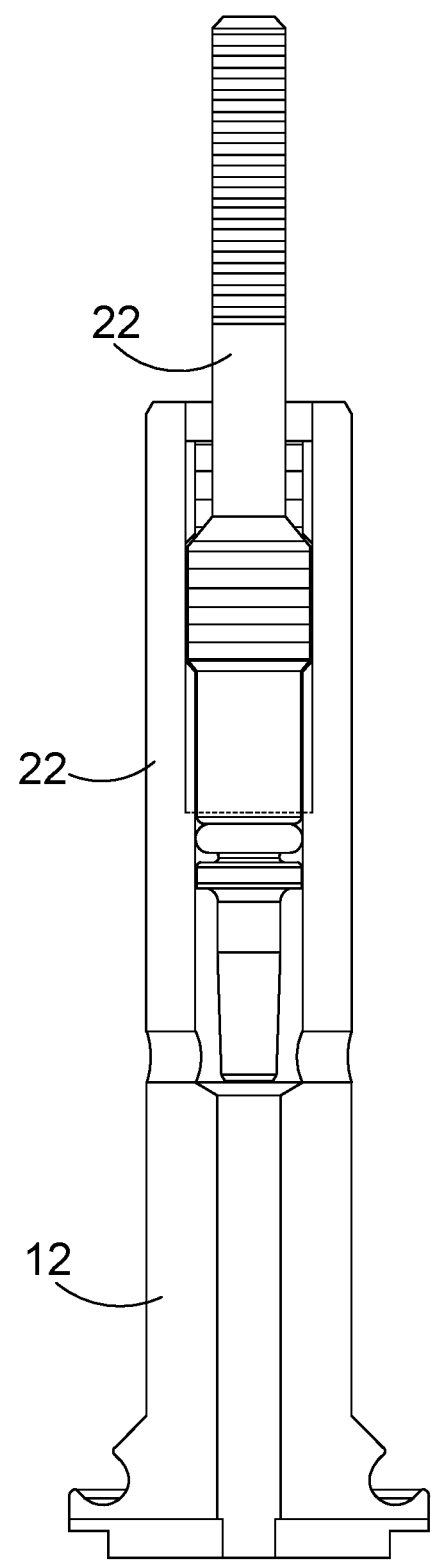
FIG. 7 shows in cross-section a detailed view of a valve assembly component of the present invention.

The reaction times of the valve apparatus can be tuned, for example by altering the springs and damping fluid variables to suit the specific requirements. Further, as shown in FIG. 7, which shows detail of the rod 12, the position of the end 13, in particular its depth within the housing, is adjustable by manipulating adjustment element 22 that at one end extends within an outer rod sleeve 23, the other end of the adjustment element projecting out from the housing. As shown in FIG. 2, the effective overall length of the rod 12 can be adjusted through manipulation of the nuts 24 provided at the top of the rod 12.

The valve of the present invention uses no control circuitry to function, it has no external vents and is easily fitted in atmosphere or subsea. With ⅜" (19.05 mm) medium pressure ports the Maximum Allowable Working Pressure is 20,000 PSI (1378.95 Bar) but also functions satisfactorily at 1000 PSI (68.95 Bar).

The valve apparatus of the present invention works in such a way to remove the problem of crude and contaminants being forced up the hydraulic lines into the HPU, and can remove the necessity to flare dangerous gases.

In this regard, the apparatus of the present invention seeks to afford a solution to a huge environmental problem of leaking fluid to sea/HPU, and leaking harmful gases that can kill people. The valve apparatus works to block the fluids and gases where they can do no harm or damage to the environment.

The apparatus of the present invention requires no pilot or tank/vent lines.

The valve apparatus of the present invention acts to automatically prevent hydrocarbon or contaminated fluid returns from entering the control system and environment.

The valve apparatus of the present invention is a single item that can fit in the palm of your hand and can be installed Topside or Subsea.

The valve apparatus of the present invention time delay is a single, simple, in-line valve. Open position is achieved by applying line pressure from 20-1379Bar. In the pressurised state the valve remains fully opened, once line pressure is reduced, the valve closes after a predefined time delay preventing locked pilot pressure. As the line pressure is re-applied the valve returns to a fully opened state allowing for communication. No pilot, vent ports or tank lines required and no additional accumulation.

The valve apparatus of the present invention has the following advantages:

Environmental Hazard protection, prevents the release of hydrocarbon gasses and chemicals to the atmosphere and sea.

Simple in-line installation process, therefore no vent, tank, or pilot lines required.

Compatible with existing infrastructure.

Compact and lightweight.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention are described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

Whilst the present invention has been described in relation to an oil and gas implementation, it will be understood that the valve apparatus can be applied to other applications where a fluid line requires a delayed closing action.

The invention claimed is:

1. Valve apparatus for regulating flow comprising:
a valve housing having a bore;
a piston member movable within the bore, a first spring member biasing the piston member in a first direction within the bore;
a first rod extending through the piston member, the first rod having an end for engaging a second spring member provided between the end and a spring seat;
wherein the piston member and spring seat define a chamber which houses the second spring member and into which the first rod is slidably received;
a second rod extending from the spring seat and being coupled to valve member seat;
wherein damping means is provided to damp the movement of the chamber within the bore.

2. Valve apparatus as claimed in claim 1, wherein the spring constant of the first and second springs is different.

3. Valve apparatus as claimed in claim 2, wherein the spring constant of the second spring is such that it is easier to compress compared with the first spring.

4. Valve apparatus as claimed in claim 1, wherein the damping means comprises a fluid provided in the bore in the region of the first spring member.

5. Valve apparatus as claimed in claim 1, wherein the damping means is tunable to different degrees of damping.

6. Valve apparatus as claimed in claim 1, wherein the piston member and spring seat are coupled together to form a piston that is movable as a unitary member within the bore.

7. Valve apparatus as claimed in claim 1, wherein the first spring member extends around the first rod.

8. Valve apparatus as claimed in claim 1, wherein the first rod comprises an adjustment element that at one end extends within an outer rod sleeve, the other end of the adjustment element projecting out from the housing for depth adjustment of the within the housing.

9. Valve apparatus as claimed in claim 1, wherein the piston member and spring seat together form a piston component and wherein damping means is provided to damp the movement of the piston component within the bore.

10. Valve apparatus for regulating flow comprising:
a valve housing having a bore;
a piston member movable within the bore, a first spring member biasing the piston member in a first direction within the bore;
a first rod extending through the piston member, the first rod having an end for engaging a second spring member provided between the end and a spring seat;
wherein the piston member and spring seat define a chamber which houses the second spring member and into which the first rod is slidably received;
a second rod extending from the spring seat and being coupled to valve member seat;
wherein the piston member and spring seat together form a piston component and wherein damping means is provided to damp the movement of the piston component within the bore.

* * * * *